US009454531B1

(12) United States Patent
Fisher et al.

(10) Patent No.: US 9,454,531 B1
(45) Date of Patent: Sep. 27, 2016

(54) MEDIA CONTENT PRESENTATION BY CATEGORIZING AND FORMATTING MEDIA TYPES

(75) Inventors: David Scott Fisher, Mountain View, CA (US); Jurek Foryciarz, Cracow (PL)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 13/438,755

(22) Filed: Apr. 3, 2012

(51) Int. Cl.
*G06F 17/30* (2006.01)

(52) U.S. Cl.
CPC ... *G06F 17/30056* (2013.01); *G06F 17/30058* (2013.01)

(58) Field of Classification Search
CPC ............. G06F 17/30017; G06F 17/24; G06F 17/2247; G06F 17/30056; G06F 17/30058
USPC ........................................ 715/249, 252, 201
See application file for complete search history.

(56) References Cited

U.S. PATENT DOCUMENTS

| 6,195,692 | B1 | 2/2001 | Hsu | |
| 7,870,279 | B2 | 1/2011 | Chuang et al. | |
| 8,005,826 | B1 | 8/2011 | Sahami et al. | |
| 2004/0177063 | A1* | 9/2004 | Weber et al. | 707/3 |
| 2006/0015580 | A1* | 1/2006 | Gabriel et al. | 709/219 |
| 2007/0088852 | A1* | 4/2007 | Levkovitz | 709/246 |
| 2008/0086456 | A1 | 4/2008 | Rasanen et al. | |
| 2009/0043739 | A1 | 2/2009 | Choi | |
| 2009/0144768 | A1 | 6/2009 | Nagaraja | |
| 2011/0004850 | A1* | 1/2011 | Lodico | G06Q 30/02 715/838 |
| 2011/0197126 | A1* | 8/2011 | Arastafar | 715/243 |
| 2012/0084516 | A1* | 4/2012 | Iwuchukwu | 711/144 |
| 2012/0110454 | A1* | 5/2012 | Chae et al. | 715/716 |

* cited by examiner

*Primary Examiner* — Scott Baderman
*Assistant Examiner* — Seung Jung
(74) *Attorney, Agent, or Firm* — Byrne Poh LLP

(57) ABSTRACT

A method for presenting media content of a website having a plurality of media content types on a media device includes receiving media content from a website at one or more computing devices over a network interface; categorizing media content from the website into a plurality of media content types comprising a text type content and a non-text type content; receiving a selection of a media content type for displaying media content items of the selected media content type by the media device; retrieving, from a memory device, display parameters for a user interface for the selected media content type; reformatting the media content items of the selected media content type for display based on the retrieved display parameters for the user interface; and providing display data, to a display device associated with the media device, representing the user interface and the reformatted media content items.

21 Claims, 4 Drawing Sheets

MEDIA CONTENT PRESENTATION BY CATEGORIZING AND FORMATTING MEDIA TYPES

TECHNICAL FIELD

The present disclosure relates generally to media presentation and, more particularly, to media content presentation on an alternative display device.

BACKGROUND

Web developers optimize websites specifically for a computer-based interaction model. Web developers are trying to convey a message with their content and choose a presentation format based on certain assumptions. For example, web developers assume a user can read 12-point font and is willing to read paragraphs of text. However, there are many different mechanisms, for instance through mobile devices, tablets, and televisions, that allow a user to explore the internet, each of which have different interaction models. The mobile market is becoming large enough that web developers are increasingly willing to reformat their own sites specifically for mobile devices. However, the internet TV browser populace (as well as users of other similar devices) is not large enough yet to motivate web developers to optimize their sites for a TV-browsing experience.

SUMMARY OF THE DISCLOSURE

A method for presenting media content of a website having a plurality of media content types on a media device includes (but is not limited to) any one or combination of: (i) receiving media content from a website at one or more computing devices over a network interface; (ii) categorizing media content from the website into a plurality of media content types, the media content types comprising a text type content and a non-text type content; (iii) receiving, from a user of the media device, a selection of a media content type for displaying media content items of the selected media content type by the media device; (iv) retrieving, from a memory device, display parameters for the selected media content type; (v) formatting the media content items of the selected media content type for display based on the retrieved display parameters; and (vi) providing display data, to a display device associated with the media device, representing the formatted media content items.

In various implementations, the non-text type content comprises at least one of video media, image media, and audio media.

In various implementations, the text type content comprises at least one of text and web links.

In various implementations, providing display data to the display device representing the formatted media content items includes displaying the formatted media content items based on the provided display data.

In various implementations, first display data is provided if the received selection is for the non-text type content and second display data, different from the first display data, is provided if the received selection is for the text type content.

In various implementations, display data representing media content items not corresponding to the selected media content type are not provided.

In various implementations, first display parameters are retrieved if the received selection is for the non-text type content and second display parameters, different from the first display parameters, are retrieved if the received selection is for the text type content.

In various implementations, the display data comprises a user interface for displaying the formatted media content items. In some implementations, a first user interface is provided if the received selection is for the non-text type content and a second user interface, different from the first user interface, is provided if the received selection is for the text type content.

In various implementations, the method includes determining relevancy of each of the received media content. Categorizing of the received media content is based on the relevancy of each of the received media content. In some implementations, media content is deemed relevant if the media content satisfies a predetermined condition.

In various implementations, the media device is one of a television, digital video recorder, video game system, optical disc player, and a media player for playing media on a television.

In various implementations, the reformatting is performed by the media device.

In various implementations, the reformatting the media content items of the selected media content type changes an appearance of the media content item to be different than an appearance of the media content item as presented on the website.

In various implementations, the media device includes a smart TV module.

A media device system for presenting media content of a website having a plurality of media content types includes (but is not limited to) a processor for receiving media content from a website at one or more computing devices over a network interface. The processor is for categorizing media content from the website into a plurality of media content types. The media content types comprise a text type content and a non-text type content. The processor is for receiving, from a user of the media device, a selection of a media content type for displaying media content items of the selected media content type by the media device. The processor is for retrieving, from a memory device, display parameters for the selected media content type. The processor is for formatting the media content items of the selected media content type for display based on the retrieved display parameters. The processor is for providing display data, to a display device associated with the media device, representing the formatted media content items.

A computer program product presenting media content of a website having a plurality of media content types on a media device includes a computer-readable medium comprising code for (but is not limited to) any one or combination of: (i) receiving media content from a website at one or more computing devices over a network interface; (ii) categorizing media content from the website into a plurality of media content types, the media content types comprising a text type content and a non-text type content; (iii) receiving, from a user of the media device, a selection of a media content type for displaying media content items of the selected media content type by the media device; (iv) retrieving, from a memory device, display parameters for the selected media content type; (v) formatting the media content items of the selected media content type for display based on the retrieved display parameters; and (vi) providing display data to, a display device associated with the media device, representing the formatted media content items.

DETAILED DESCRIPTION

Various implementations are directed toward systems and methods for extracting user-specified media content (e.g., video, images, text, audio, links, etc.) from a webpage and presenting such content in a user interface appropriate for a TV browser or other device browser for which the webpage was not designed. One or more implementations may extract media content and based on the type of the media content present user interface for presenting the media content. One or more implementations may extract media content and present the media content in a user interface based on the device upon which the media content is being viewed and/or particular user interaction model (e.g., small, mobile phone-sized display with touch screen, tablet-sized display with touch screen, 42-inch flat screen TV with remote control device and no mouse, etc.). One or more implementations may provide an improved user experience that does not require a user to scroll down on a web page to a video's location, click a small play button, then click a small "full screen" button, and/or the like. Thus, according to various implementations, website media resources and content are presented in a format appropriate for the client display device in addition to, or in place of, the default browser rendering, which is typically optimized for a computer interaction model.

Figure 1:
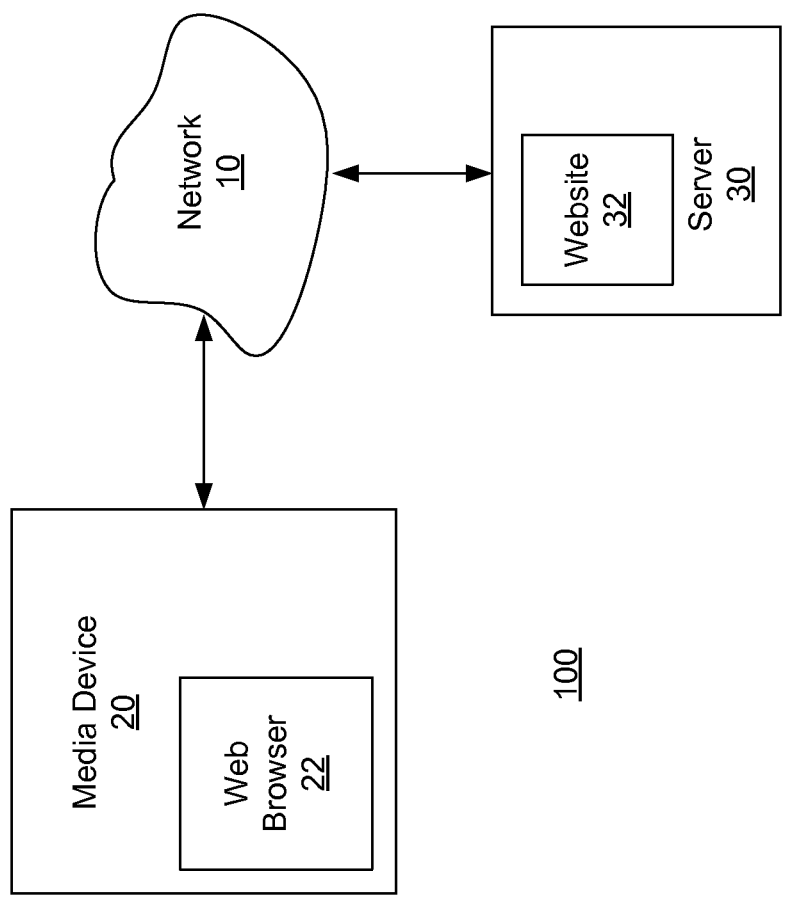
FIG. 1 is an illustrative network environment according to various implementations of the disclosure.

FIG. 1 is an illustrative network environment 100 including a media device 20. The media device 20 is configured to transmit and/or receive data and information over a wireless communication interface (e.g., network 10). Coupled with the network 10 are one or more servers illustrated by server 30. In various implementations, a website 32 may reside on the server 30. The network 10 may represent one or both of local area networks (LAN) and wide area networks (WAN) and/or any other network environment. In particular implementations, the media device 20 may be coupled to the server 40 via a WAN (e.g., Internet), for instance via a WLAN provided by a router or the like.

The media device 20 can be, but is not limited to, a set-top box, a television (TV) or smart TV, a disk player (e.g., Blu-Ray, high-definition digital versatile disc (HD-DVD), digital versatile disc (DVD), etc.), a digital video recorder (DVR), a video game system, a media player, or other computing device (e.g., mobile phone, a tablet computer, personal digital assistant, etc.).

In various implementations, the media device 20 is or includes a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device.

A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content that is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user.

A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

Figure 2:
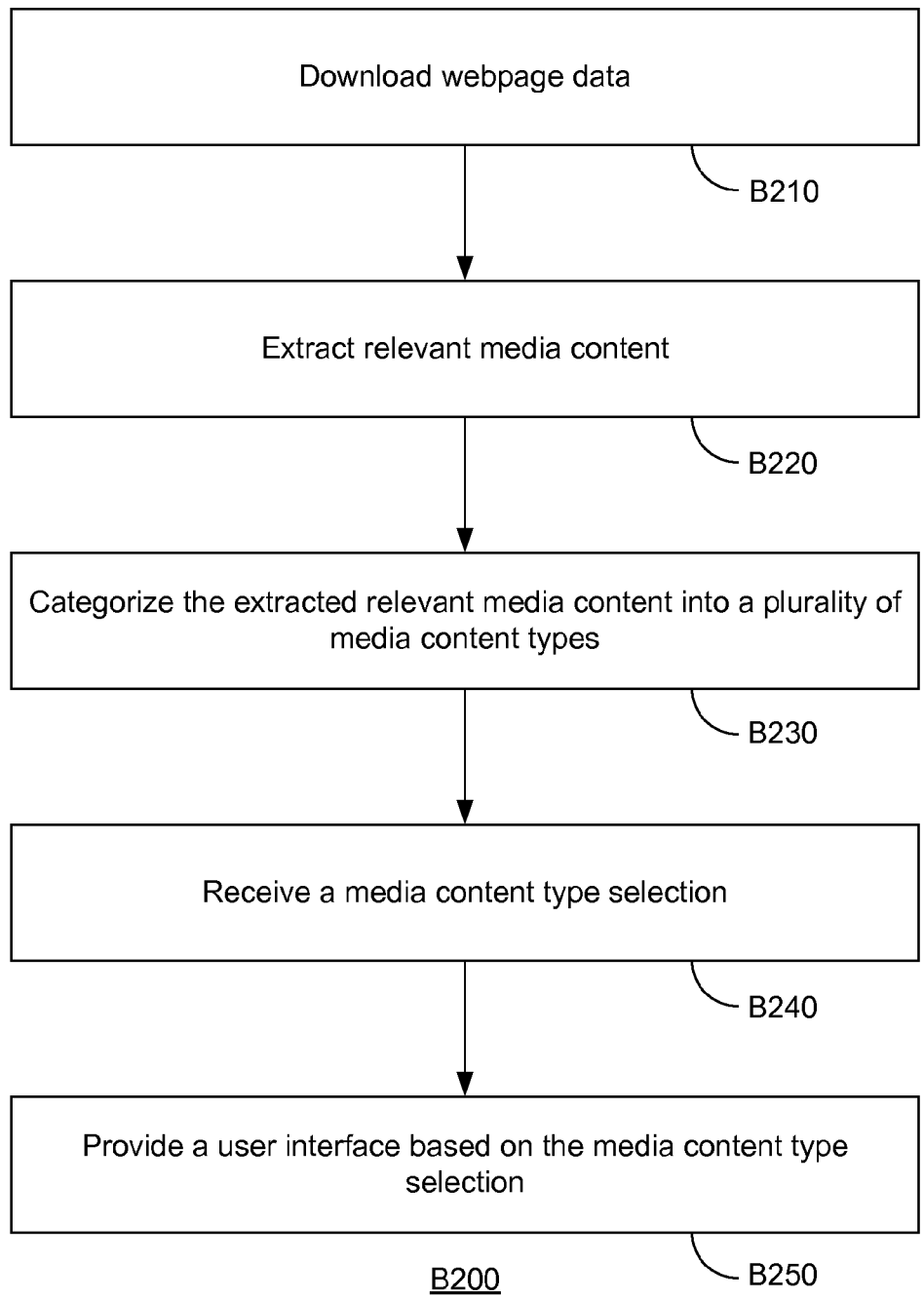
FIG. 2 illustrates a media content presentation method according to various implementations of the disclosure.
Figure 4:
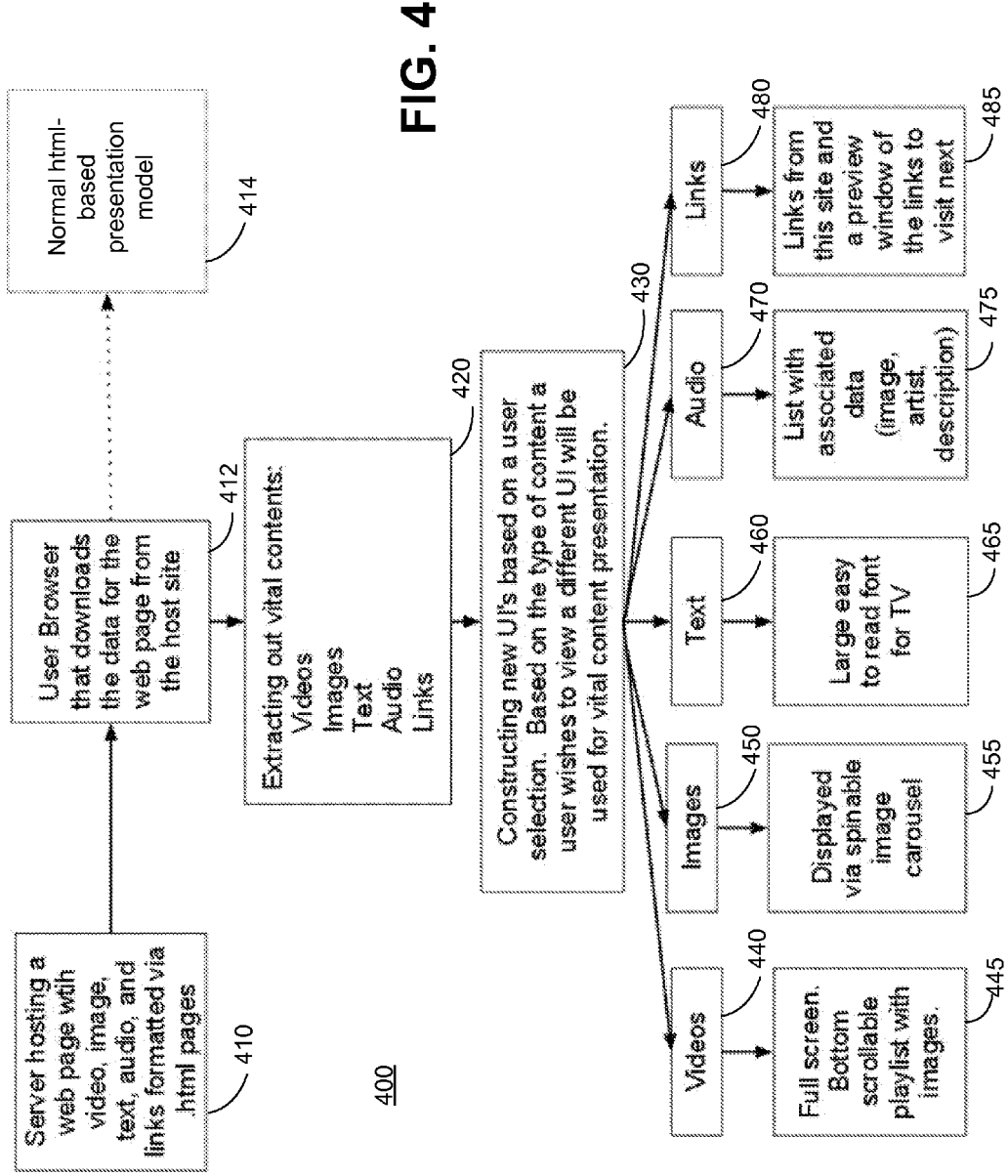
FIG. 4 illustrates a media content presentation flow diagram according to various implementations of the disclosure.

FIG. 2 illustrates a media content presentation method B200 (which may correspond to flow diagram 400 in FIG. 4) according to various implementations of the disclosure. According to various implementations, the method B200 may be performed by the media device 20 and/or the browser 22 for the media device 20. With reference to FIGS. 1, 2, and 4, as noted in the disclosure, in various implementations, one or more servers 30 host one or more webpages 32 with media content, such as, but not limited to, video content, image content, audio content, text, content, and link content formatted via HTML files or the like (410).

At block B210 (412), the media device 20 (e.g., browser 22 or other application for building a display running on the media device 20) downloads data, such as the HTML file and the media resources linked within the HTML file, from the webpage 32 provided on the server 30. Block B210 may occur immediately upon a user visiting the webpage 32 with the media device 20 (e.g., by typing in a uniform resource locator (URL) or clicking on a link that brings the user to the URL from a home page, desktop page, or search results page). In other implementations, block B210 may occur in advance of a user visiting the webpage 32 with the media device 20. For instance, the data may be downloaded based on a prior visit to the webpage 32.

At block B220 (420), the media device 20 extracts relevant media content (e.g., video, images, audio, text, and/or links) from the data downloaded from the webpage 32. In particular implementations, the relevant media content, which may be used for presentation as described in the disclosure, may be extracted from miscellaneous information in the data, such as the HTML file. For instance, the miscellaneous information, which may be otherwise ignored or discarded, may include style (CSS), JavaScript used for page interactions, DOM structural elements, etc. For relevant media content that relates to video media content, image media content, and audio media content, in some implementations, the media device 20 may search for the locations of known video, image, and audio file types, for instance, as referenced from HTML, located on a sitemap of the webpage 32, and/or the like. For relevant media content that relates to text media content and link media content, in some implementations, the media device 20 may parse the HTML for the webpage 32 to extract relevant text and/or links.

At block B230, the media device 20 categorizes the extracted relevant media content into a plurality of media content types including (but not limited to) a video media content type, an image media content type, an audio media content type, a text media content type, and a link media content type. In other implementations, the categorization is performed in advance, for instance at? a remote server. In such implementations, the media device 20 may query the remote server to determine how the extracted relevant media content is categorized for the given webpage.

At block B240, the media device 20 receives or otherwise determines a media content type selection. In some implementations, the media content type selection corresponds to a user selection of a list of media content types provided by the media device 20. In particular implementations, the list is based on the media content types categorized at block B230. In other implementations, the selection is based on a user history (e.g., user's history on this webpage, user's history on similar webpages, user's usage on the device, etc.), the media device 20 usage (e.g., primarily used to play video media), other users' history (e.g., the media content type typically viewed by other users visiting the webpage 32), etc. In such implementations, for instance, the media content type selection is received or otherwise determined automatically, or without requiring specific user selection or input of the media content type. In other implementations, the selection is based on the type of webpage. For instance, visiting a known photo-sharing website will cause image media content type to be selected automatically. In some implementations, the content type selection is received before extracting the relevant media content and/or the webpage 32 data is downloaded. In such implementations, only the content type corresponding to the content type selection received can be extracted and/or downloaded.

In various implementations, media content may be deemed as relevant (e.g., B220), categorized (e.g., B230), and/or selectable as a media content type (e.g., B240) if the content is one of a predefined set of media content types, for instance, video, images, audio, text, and/or links. In other implementations, the predefined set of media content types may include any number of media content types. In some implementations, only media content that meets certain conditions will be considered relevant (e.g., B220), categorized (e.g., B230), and/or selectable as a media content type (e.g., B240). For instance, media content on a webpage 32 may be considered relevant if that media type has at least a certain (e.g., predetermined) number of instances and/or is at least a certain percentage of the webpage 32. To illustrate, for a webpage that has four videos (threshold is at least one video), one song (threshold is at least one song), two images (threshold is at least five images), nine links (threshold is at least 10 links), and 73 words (threshold is at least 300 words), only video media content and audio content may be deemed as relevant.

At block B250 (430), the media device 20 displays or otherwise provides a user interface (UI) on a display screen (e.g., television screen) associated with the media device 20 based on the selected type of media content. In particular implementations, a UI (or display parameters for generating a UI) for displaying media content like the selected media content type is retrieved from a memory of the media device 20 for display. The media content on the webpage 32 may be reformatted for presentation on the provided UI and presented accordingly. According to some implementations, the display parameters may define the manner in which media content items for a user interface will be presented (e.g., aspect ratio, location of control elements, location of media content items, information relating to the display device, etc.).

Some (non-limiting) illustrative UIs are provided.

For video media content 440, a full-screen UI (e.g., a first UI) may be displayed or otherwise provided (445). The UI may include a playlist of images (e.g., thumbnails) of selectable videos that were on the webpage 32. Playback of a video (full screen or on a portion of the screen) may begin upon selection of the video or immediately after the UI is displayed. Playback of an additional video may follow automatically after the video ends or in response to another user selection. The UI may also include any associated meta data, such as title, description, and/or the like.

For image media content 450, a UI (e.g., a second UI) with a carousel of images or other appropriate mechanism for displaying images found on the webpage 32 may be displayed or otherwise provided on the display device (455).

For audio media content 470, a UI (e.g., a third UI) is displayed or otherwise provided with associated data for the audio media content. For instance, album covers, artist information, recommendations, content description information, and/or the like may be displayed (475). Playback of a song or other audio content may begin upon selection of the song or immediately after the UI is displayed. Playback of an additional song may follow automatically after the song ends or in response to another user selection. The UI may also include any associated meta data, such as title, image, description, and/or the like.

For text media content 460, a UI (e.g., a fourth UI) that uses a large, easy-to-read font is displayed or otherwise provided (465). The font type and/or size may be configured by the user (or set in advance). In some implementations, the font type and/or size may be determined based on the size of the display device, resolution of the display device, distance user sitting from the display device, and/or the like. For example, the user may input that the user's seat is six feet from the display device, the display device has a diagonal of 50", and 1080p resolution. Accordingly, the system may select a font size for reading based on those parameters. It should be noted that text media content may include any type of text, such as a news article, blog article, caption, and/or the like.

For link media content 480, a UI (e.g., a fifth UI) may be displayed or otherwise provided containing a preview window for one or more of the links provided on the display device (485). It should be noted that link media content may include any type of web link.

In some implementations, the media device 20 is configured to provide a plurality of different user interfaces each corresponding to a media content type. A UI is provided (e.g., B250) from among the plurality of UIs based on the received media content type selection. For instance, the media device 20 may be configured to provide a first UI for displaying (or otherwise providing) video media, a second UI for image media, a third UI for audio media, a fourth UI for text media, and a fifth UI for link media. Thus, for instance, if image media content type is selected for a webpage, then the third UI is provided by the media device 20.

Thus, according to various implementations, website media resources and content are presented in a format (e.g., 445, 455, 465, 475, 485) appropriate for the media device and/or display associated with the media device in addition to, or in place of, the default browser rendering 414, which is typically optimized for a computer interaction model. As such, website media resources and content may be reformatted to provide a different appearance (e.g., visual presentation) on the display device than as provided on a website through default browser rendering.

Figure 3:
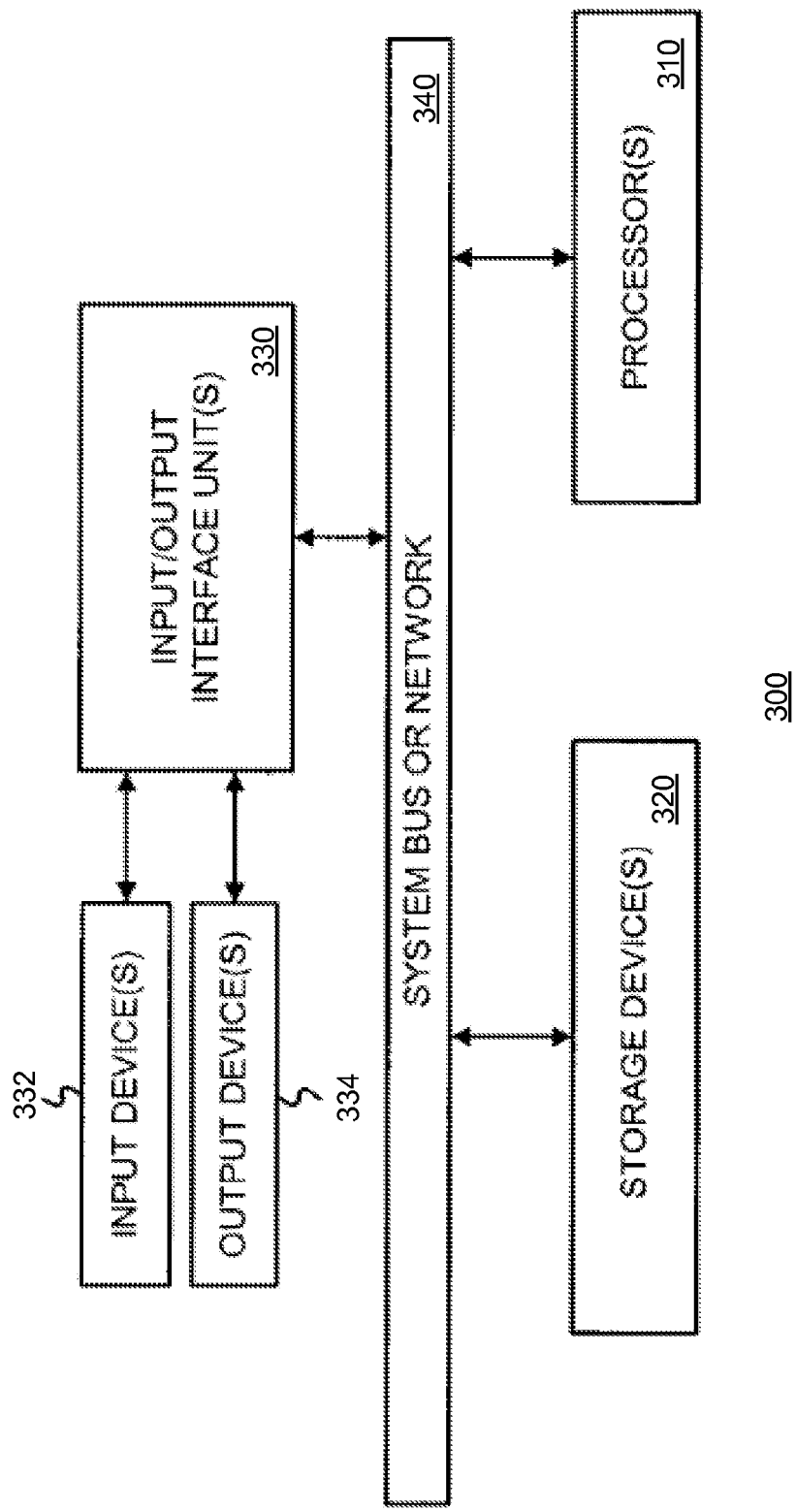
FIG. 3 is a block diagram of a media device according to various implementations of the disclosure.

FIG. 3 is a block diagram illustrating a media device (e.g., 20 in FIG. 1) that can be used to perform at least some of the various operations described in the disclosure. With reference to FIGS. 1-4, the media device 20 includes an address/data bus 340 for communicating information between one or more of the components of the media device 20. A processor 310 is coupled with the bus 340 for processing information and instructions. The components may be configured to communicate with each other using interfaces such as (but not limited to) one or more universal serial bus (USB) interfaces, micro-USB interfaces, universal asynchronous receiver-transmitter (UART) interfaces, general purpose input/output (GPIO) interfaces (e.g., inter-integrated circuit (i2C)), control/status lines, control/data lines, shared memory, and/or the like.

The processor 310 may be responsible for executing various software programs such as application programs (e.g., web browser 22) and system programs to provide computing and processing operations for the media device 20. The processor 310 may be responsible for performing various voice and data communications operations for the media device 20 such as transmitting and receiving voice and data information over one or more wireless communications channels.

The media device 20 includes a storage device 320 that can include any suitable type of storage including, for example, a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or any other type of storage medium. The media device 20 may include volatile memory (e.g., random access memory, RAM) coupled with the bus 340 for storing information and instructions for the processor 310 and/or a non-volatile memory (e.g., read only memory, ROM) coupled with the bus 340 for storing static information and instructions for the processor 310. In other implementations, memory may be implemented using any machine-readable or computer-readable media capable of storing data such as (but not limited to) volatile memory or non-volatile memory, removable or nonremovable memory, erasable or non-erasable memory, writeable or re-writeable memory, and/or the like. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information. In some implementations, a PC board or the like can contain, for example, the processor 310, the bus 340, the RAM, the ROM, and/or the like.

Although the memory may be shown as being separate from the processor 310 for purposes of illustration, in various implementations, some portion or the entire memory may be included on the same integrated circuit as the processor 310. Alternatively, some portion or the entire memory may be disposed on an integrated circuit or other medium (e.g., hard disk drive) external to the integrated circuit of the processor 310. In various implementations, the media device 20 may comprise an expansion slot (not shown) to support a multimedia and/or memory card, for example.

In various implementations, the media device 20 may comprise an input/output (I/O) interface 330 coupled to the processor 310. The I/O interface 330 may comprise one or more I/O devices such as (but not limited to) a serial connection port, an infrared port, integrated Bluetooth® wireless capability, integrated 802.11x (WiFi) wireless capability, and/or the like to enable wired (e.g., USB cable) and/or wireless connection to a local device, such as a base station, a personal computer (PC), and/or the like. Some non-limiting examples of input devices 332 for providing data to the media device 20 (e.g., directly to the media device 20 or via an intermediary device) include, but are not limited to, a keyboards, a pointing device (e.g., a mouse), a microphone, a touch input interface, a joystick, a game pad, a satellite dish, a scanner, and/or the like. An output device 334 may include (but is not limited to) a monitor or other types of display devices, which can be connected to the bus 340 via an appropriate interface. In addition (or instead of) the monitor, the user terminal may include other (peripheral) output devices (not shown), such as speakers and printers for example. In some cases, the output device 334 can include a component for providing one or more of a visual output, a haptic output, or an audio output.

In various implementations the media device 20 also includes a communication module that may be part of (or otherwise associated with) the I/O interface 330. The communication module may comprise one or more transceivers configured to communicate using different types of protocols, communication ranges, operating power requirements, RF sub-bands, information types (e.g., voice or data), use scenarios, applications, and/or the like. In various implementations, the communication module may comprise one or more transceivers configured to support communication with local devices (e.g., personal device 10, base station, server, and/or the like) using any number or combination of communication standards.

In various implementations, the communication module can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). Power for the communication module 230 may be supplied by the battery cells 210.

In various implementations, the communication module may comprise one or more transceivers configured to perform data communications in accordance with one or more wireless communications protocols such as (but not limited to) WLAN protocols (e.g., IEEE 802.11 a/b/g/n, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communication module may be coupled to the bus 340 for providing a communication link between the media device 20 and the network 30. As such, the communication module enables the processor 310 to communicate wirelessly with other electronic systems coupled to the network 30. For instance, the communication module may be coupled to an antenna (not shown) and provides functionality to transmit and receive information over a wireless communication interface.

As such, in various implementations, the communication module is for communicating with a remote device. For instance, in some implementations, the communication module is for communicating with a remote device, such as the server 30 (having the webpage 32), via the network 10. In some implementations, the communication module is for communicating directly with a base station (e.g., hub, router, etc.) or other local device.

The communication module may be implemented using one or more chips as desired for a given implementation. In some implementations, the communication module may be separate from and external to the processor 310. In various implementations, some portion or the entire communication module may be included on the same integrated circuit as the processor 310.

In some implementations, the media device 20 may include an antenna system (not shown) for transmitting and/or receiving electrical signals using WWAN protocols, WLAN protocols, and/or the like. For instance, the antenna system may be coupled to the processor 310 through the communication module. The antenna system may comprise or be implemented as one or more internal antennas and/or external antennas.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method for presenting media content of a website having a plurality of media content types on a media device, the method comprising:
   receiving media content items associated with a webpage from a website at the media device over a network interface;
   categorizing, using the media device, each of the media content items from the webpage into at least one media content type of a plurality of media content types, wherein the at least one media content type is one of: video media, image media, audio media, text, and links;
   determining that a number of media content items associated with one of the plurality of media content types exceeds a predetermined threshold;
   selecting at least one of the plurality of media content types for displaying the media content items of the selected media content type on a display device associated with the media device based on the determination that the number of media content items associated with the selected media content type exceeds the predetermined threshold and based on a webpage type associated with the webpage;
   identifying, from a memory device of the media device, display parameters relating to the display device associated with the media device for a user interface for displaying the webpage that includes a media content item corresponding to the selected media content type on the display device;
   reformatting the media content item of the selected media content type for display on the display device based on the identified display parameters for the user interface, wherein the reformatting the media content item of the selected media content type comprises changing an appearance of the media content item of the selected media content type to be different from an appearance of the media content item as presented on the webpage; and
   generating the user interface to be displayed on the display device, wherein the user interface includes the reformatted media content item of the selected media content type and inhibits presentation of media content items corresponding to non-selected media content types.

2. The method of claim 1, wherein a first user interface is generated if the selected media content type corresponds to one of the video media, the image media, and the audio media, and wherein a second user interface is generated if the selected media content type corresponds to text.

3. The method of claim 1, wherein first display parameters are identified if the selected media content type corresponds to one of the video media, the image media, and the audio media, and wherein second display parameters, different from the first display parameters, are identified if the selected media content type corresponds to text.

4. The method of claim 1, further comprising:
   determining a relevancy of each of the received media content items;
   wherein categorizing each of the received media content items is based on the relevancy of each of the received media content items.

5. The method of claim 4, wherein the media content item from the received media content items is deemed relevant if the media content item satisfies a predetermined condition.

6. The method of claim 1, wherein the media device is one of a television, a smart television module, a digital video recorder, a video game system, an optical disc player, and a media player for playing media on a television.

7. The method of claim 1, wherein the reformatting is performed by the media device.

8. A media device system for presenting media content of a website having a plurality of media content types, the system comprising:
   a processor configured to receive media content items associated with a webpage from a website at a media device over a network interface;
   the processor configured to categorize each of the media content items from the webpage into at least one media content type of a plurality of media content types, wherein the at least one media content type is one of: video media, image media, audio media, text, and links;
   the processor configured to determine that a number of media content items associated with one of the plurality of media content types exceeds a predetermined threshold;
   the processor configured to select at least one of the plurality of media content types for displaying the media content items of the selected media content type on a display device associated with the media device based on the determination that the number of media content items associated with the selected media content type exceeds the predetermined threshold and based on a webpage type associated with the webpage;
   the processor configured to identify, from a memory device of the media device, display parameters relating to the display device associated with the media device for a user interface for displaying the webpage that includes a media content item corresponding to the selected media content type on the display device;
   the processor configured to reformat the media content item of the selected media content type for display on the display device based on the identified display parameters for the user interface, wherein the reformatting the media content item of the selected media content type comprises changing an appearance of the media content item of the selected media content type to be different from an appearance of the media content item as presented on the webpage; and
   the processor configured to generate the user interface to be displayed on the display device, wherein the user interface includes the reformatted media content item of the selected media content type and inhibits presentation of media content items corresponding to non-selected media content types.

9. The system of claim 8, wherein a first user interface is generated if the selected media content type corresponds to one of the video media, the image media, and the audio media, and wherein a second user interface is generated if the selected media content type corresponds to text.

10. The system of claim 8, wherein first display parameters are identified if the selected media content type corresponds to one of the video media, the image media, and the audio media, and wherein second display parameters, different from the first display parameters, are identified if the selected media content type corresponds to text.

11. The system of claim 8, wherein the processor is further configured to:
   determine a relevancy of each of the received media content items;
   wherein categorizing each of the received media content items is based on the relevancy of each of the received media content items.

12. The system of claim 10, wherein the media content item from the received media content items is deemed relevant if the media content item satisfies a predetermined condition.

13. The system of claim 8, wherein the media device is one of a television, a smart television module, a digital video recorder, a video game system, an optical disc player, and a media player for playing media on a television.

14. The system of claim 8, wherein the reformatting is performed by the media device.

15. A computer program product presenting media content of a website having a plurality of media content types on a media device, the computer program product comprising:
   a non-transitory computer-readable medium comprising code for:
      receiving media content items associated with a webpage from a website at the media device over a network interface;
      categorizing each of the media content items from the webpage into at least one media content type of a plurality of media content types, wherein the at least one media content type is one of: video media, image media, audio media, text, and links;
      determining that a number of media content items associated with one of the plurality of media content types exceeds a predetermined threshold;
      selecting at least one of the plurality of media content types for displaying the media content items of the selected media content type on a display device associated with the media device based on the determination that the number of media content items associated with the selected media content type exceeds the predetermined threshold and based on a webpage type associated with the webpage;
      identifying, from a memory device of the media device, display parameters relating to the display device associated with the media device for a user interface for displaying the webpage that includes a media content item corresponding to the selected media content type on the display device;
      reformatting the media content item of the selected media content type for display on the display device based on the identified display parameters for the user interface wherein the reformatting the media content item of the selected media content type comprises changing an appearance of the media content item of the selected media content type to be different from an appearance of the media content item as presented on the webpage; and
      generating the user interface to be displayed on the display device, wherein the user interface includes the reformatted media content item of the selected media content type and inhibits presentation of media content items corresponding to non-selected media content types.

16. The computer program product of claim 15, wherein a first user interface is generated if the selected media content type corresponds to one of the video media, the image media, and the audio media, and wherein a second user interface is generated if the selected media content type corresponds to text.

17. The computer program product of claim 15, wherein first display parameters are identified if the selected media content type corresponds to one of the video media, the image media, and the audio media, and wherein second display parameters, different from the first display parameters, are identified if the selected media content type corresponds to text.

18. The computer program product of claim 15, wherein the non-transitory computer-readable medium further comprises code for:
   determining a relevancy of each of the received media content items;
   wherein categorizing each of the received media content items is based on the relevancy of each of the received media content items.

19. The computer program product of claim 18, wherein the media content item from the received media content items is deemed relevant if the media content item satisfies a predetermined condition.

20. The computer program product of claim 15, wherein the media device is one of a television, a smart television module, a digital video recorder, a video game system, an optical disc player, and a media player for playing media on a television.

21. The computer program product of claim 15, wherein the reformatting is performed by the media device.

* * * * *